United States Patent [19]

Thorsrud

[11] 4,234,934
[45] Nov. 18, 1980

[54] APPARATUS FOR SCALING MEMORY ADDRESSES

[75] Inventor: Lee T. Thorsrud, St. Paul, Minn.

[73] Assignee: Sperry Rand Corporation, New York, N.Y.

[21] Appl. No.: 964,994

[22] Filed: Nov. 30, 1978

[51] Int. Cl.³ .............................................. G06F 13/00
[52] U.S. Cl. ................................................... 364/900
[58] Field of Search .................. 364/200 MS, 900 MS

[56] References Cited

U.S. PATENT DOCUMENTS

| | | | |
|---|---|---|---|
| 3,681,757 | 8/1972 | Allen et al. | 364/200 |
| 3,967,251 | 6/1976 | Levine | 364/200 |
| 4,095,265 | 6/1978 | Vrba | 364/200 |
| 4,118,773 | 11/1978 | Raguin et al. | 364/200 |

OTHER PUBLICATIONS

Crooks et al.–Addressing of Different Size Storage Modules–IBM TDB vol. 17, No. 6–Nov. 1974–pp. 1736–1737.

Primary Examiner—Harvey E. Springborn
Attorney, Agent, or Firm—Kenneth G. Grace; William E. Cleaver; Marshall M. Truex

[57] ABSTRACT

Apparatus for scaling addresses received by a memory module in a modular requestor-memory system in which standard memory modules may be of a discretely variable size and utilized in a plurality of positions in an overall contiguous memory addressing scheme. In particular, this scaling apparatus enables a modular memory which is only partially populated, i.e., only able to respond to a subset of the set of all addresses available, to be located in any one of several positions representing different addressing ranges. This is accomplished without modification of the memory module itself. The memory module knows its discrete capacity, or size, by virtue of the population of the memory array storage locations (array cards) contained therein. The memory module then uses this information to scale, or strip off, the appropriate number of bits from the gross address to allow addressing of the restricted number of memory locations present in the memory module.

5 Claims, 12 Drawing Figures

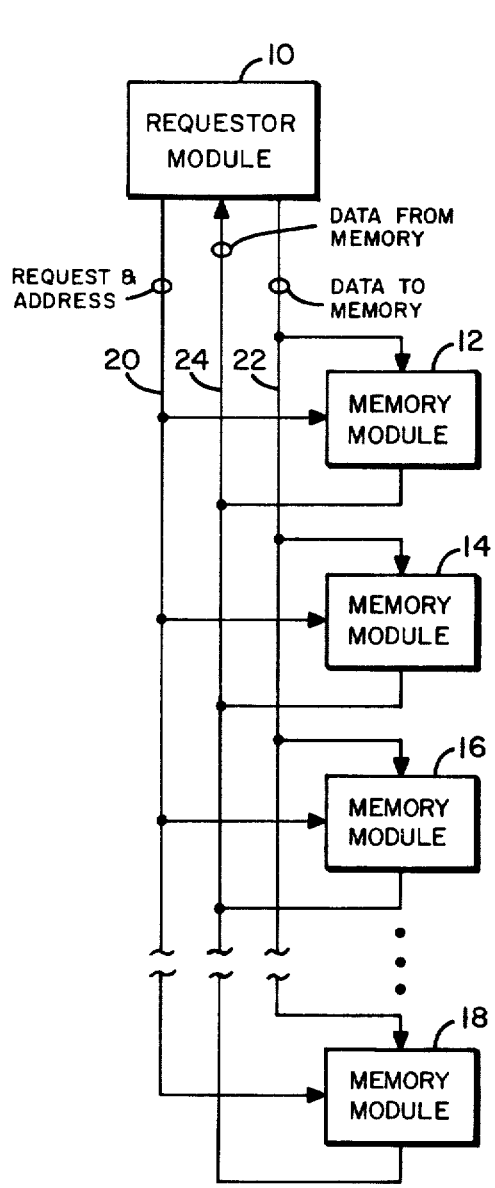
_Fig. 1_
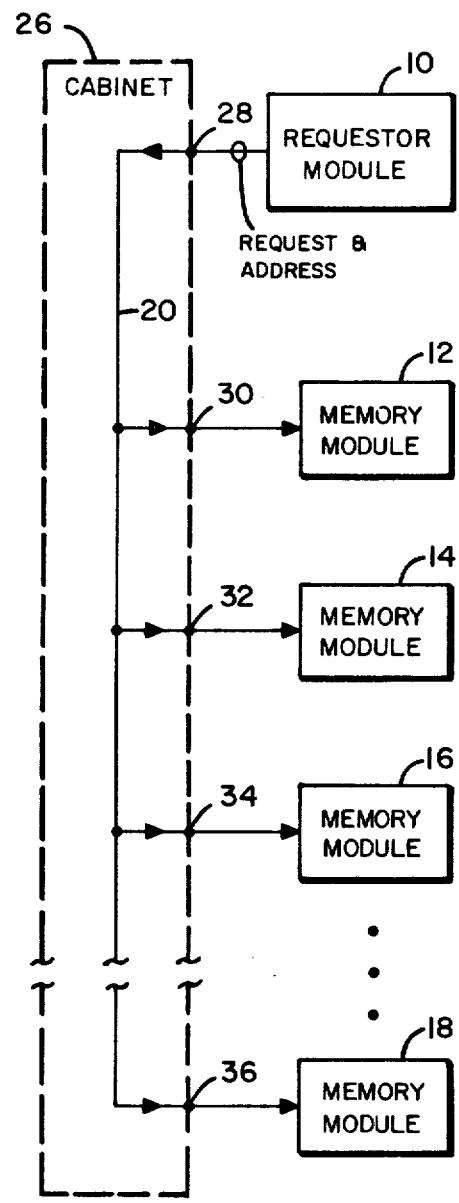
_Fig. 2_

| ADDRESS BIT | | | | MEMORY REQ # | MEMORY MODULE |
|---|---|---|---|---|---|
| 17 | 16 | 15 | 14 | | |
| 0 | 0 | 0 | 0 | 0 | A |
| 0 | 0 | 0 | 1 | 0 | B |
| 0 | 0 | 1 | 0 | 1 | C |
| 0 | 0 | 1 | 1 | 1 | D |
| 0 | 1 | 0 | 0 | 2 | E |
| 0 | 1 | 0 | 1 | 2 | E |
| 0 | 1 | 1 | 0 | 3 | E |
| 0 | 1 | 1 | 1 | 3 | E |
| 1 | 0 | 0 | 0 | 4 | F |
| 1 | 0 | 0 | 1 | 4 | F |
| 1 | 0 | 1 | 0 | 5 | F |
| 1 | 0 | 1 | 1 | 5 | F |
| 1 | 1 | 0 | 0 | 6 | F |
| 1 | 0 | 0 | 1 | 6 | F |
| 1 | 0 | 1 | 0 | 7 | F |
| 1 | 0 | 1 | 1 | 7 | F |

*Fig. 5*

| 17 | 16 | 15 |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

TOTAL CAPACITY POSSIBLE 256K

BEFORE SCALING

BEFORE SCALING

AFTER SCALING

AFTER SCALING

APPARATUS FOR SCALING MEMORY ADDRESSES

BACKGROUND OF THE INVENTION

This invention relates generally to digital computer systems and more particularly to requestor (e.g., central processing unit) -memory systems.

Present day computer systems are constructed on a modular basis. That is, in a digital computer system requestor modules and memory modules are put together to form the requestor-memory system. In a modular digital computer of this sort a cabinet or other host apparatus is wired to accept standard modules, as for example standard memory modules. Modules then need to be standardized to fit in any appropriate position in the wired cabinet. That is there must be substitutability between the standard modules. A standard memory module needs to work just as well in a first location wired for a standard memory module as in any other location wired for that standard memory module.

Another key element in present day digitial computer systems is expandability. Memory modules may be of many different sizes. For example, a single memory module may have a total capacity of 264,144 words (hereinafter generally referred to as 256,000 words). However, that same memory module may be available in smaller versions, as for example 65,256 words (hereinafter generally referred to as 64,000 words) or 134,072 words (hereinafter generally referred to as 128,000 words) versions. If these memory modules are dependent upon where they are placed in the overall requestor memory addressing scheme, then a different version of a standard memory is needed for each position. If the memory module is position dependent, then the memory modules are not available for relocation in different positions in the wired cabinet. This would eliminate such common and needed techniques as troubleshooting, preventive maintenance and reduced capacity fail-soft operations.

The addressing structure of the requestor-memory system must be able to accommodate memory modules of different sizes at different locations and, conversely, memory modules, in order to be standardized, must accommodate the addressing scheme available at any appropriate location within the wired cabinet. That is, a 64,000 word memory must be able to operate in any location within the cabinet wired to accommodate a 64,000 word memory. The memory module must not be dependent upon where it is located within the physical wired cabinet location and hence the position in the overall requestor-memory addressing scheme.

SUMMARY OF THE INVENTION

The present invention solves the problem of address selection based upon the location of the memory module within the wired cabinet when only part of the memory is populated or whenever the memory module serves only part of the overall requestor-memory addressing range.

The memory module in the present invention scales the address received from the requestor to a smaller size depending upon the capacity of the memory itself. The memory module knows its own capacity because it knows the number of array cards or storage locations actually populated within its module. The memory module utilizes this information to strip off the upper address bits of the address supplied to the memory from the requestor to scale the address down to the size needed to address the populated memory locations.

This scaling or stripping off of upper address bits is accomplished by logically "ANDing" the upper address bits received to signals which represent the number of array cards present in the memory module. Thus, if few array cards are present, many bits of the address are stripped and if many array cards are present few bits are stripped from the address.

The result of this invention is that only one version of a partially populated memory need to be manufactured, stocked, provisioned, nomenclatured and spared. For example, assume a total requestor-memory system consisting of an addressing range of 256,000 words. If a 256,000 word memory module is offered and utilized, then that memory module will need and utilize all of the address bits available from the requestor. However, the digital computer system may also offer, for example, a 64,000 word memory module. However, this 64,000 word memory module could be located in four positions in the addressing scheme, i.e., from 0 through 64,000, from 64,000 through 128,000, from 128,000 through 192,000 and from 192,000 through 256,000. With this invention only one version of the 64,000 word memory module needs to be provided, namely the 0 through 64,000 word version. The addressing is automatically scaled to accommodate this addressing range within the memory module itself.

BRIEF DESCRIPTION OF THE DRAWINGS

FIG. 1 is a functional diagram of a requestor and multi-memory module digital computer illustrating the modular memory system;

FIG. 2 is another functional block diagram illustrating the routing of the request and address signals from the requestor module through a wired cabinet to a plurality of memory modules;

FIG. 5 is a table illustrating the address ranges of the memory module locations illustrated in FIG. 4;

DESCRIPTION OF THE PREFERRED EMBODIMENT

Figure 3:
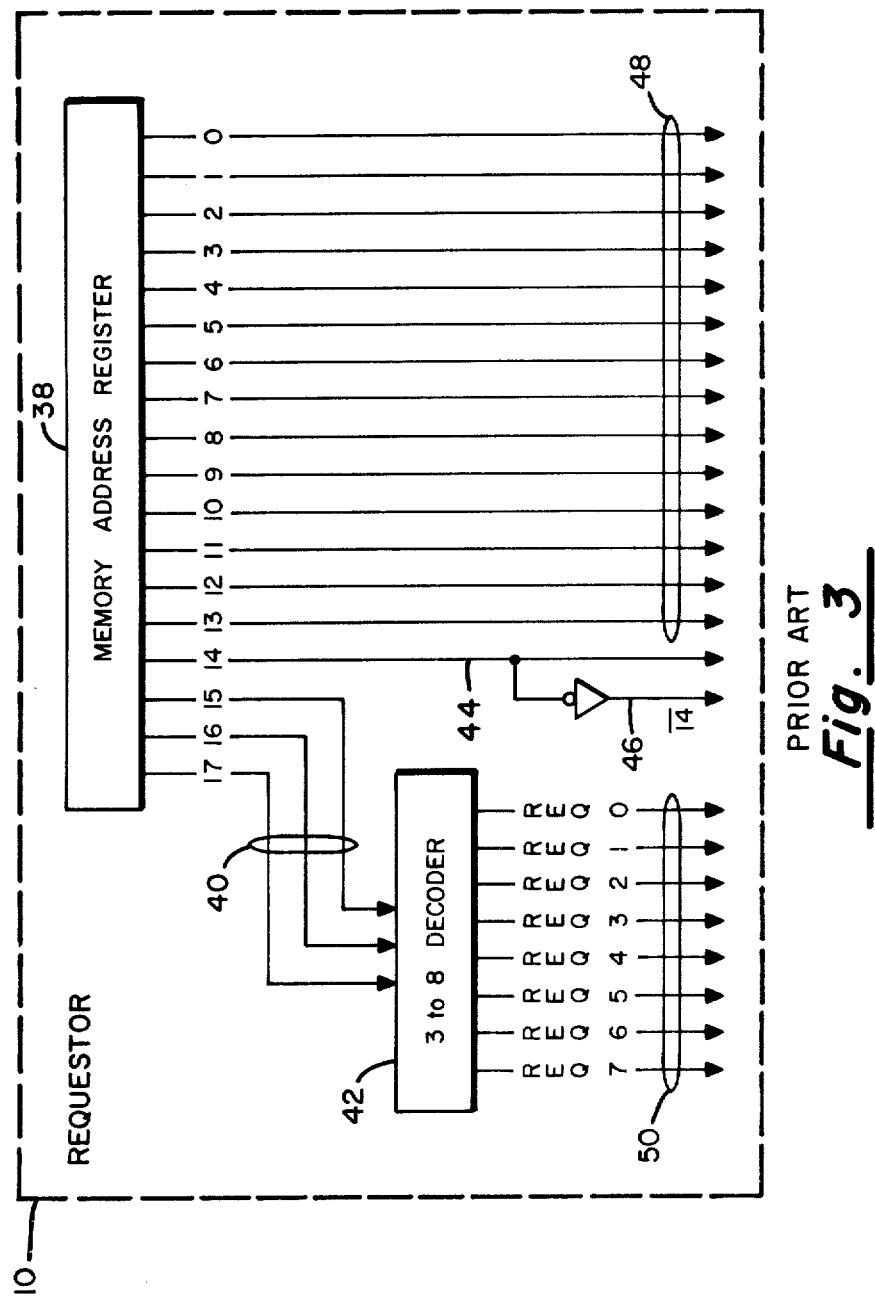
FIG. 3 illustrates the request and address signals generated within the requestor module in the preferred embodiment of the present invention.

In order to better understand and appreciate the present invention it is necessary to understand the digital computer system and memory addressing scheme in which the preferred embodiment of the present invention is utilized. The preferred embodiment of the present invention is designed to be utilized in the AN/UYK-7(V) computer set. The AN/UYK-7(V) computer set is a standard piece of military hardware currently in the inventory of the United States Department of Defense. The reader is urged to familiarize himself with the AN/UYK-7(V) computer set to fully understand the disclosure herein. Circuit diagrams for the AN/UYK-7(V) computer set are designated NAVSEA 0967-LP-319-4030 and NAVSEA 0967-LP-319-4040. They may be obtained from the Naval Sea Systems Command located in Washington, D. C. Also of interest and available through the same source are NAVSEA 0967-LP-319-4010 and NAVSEA 0967-LP-319-4020 which are the technical description and parts list, respectively, for the AN/UYK-7(V) computer set.

While the background for the present invention is fully contained and described in the above referenced documents, description will be provided here for the necessary details of the request and address interface between the requestor modules and the memory modules in the AN/UYK-7(V) computer set as designed before the present invention and updated to take full advantage of the utilization of the present invention.

FIG. 1 illustrates a functional block diagram basically illustrating a modular multi-memory system. Here requestor module 10 has access to a plurality of memory modules 12, 14, 16 and 18. Note that the requestor module 10 sends request and address information along request and address bus 20 to each of memory modules 12, 14, 16, 18. Likewise, requestor 10 sends data to memory along bus 22 and obtains data from memory along bus 24. FIG. 1 illustrates that the total memory capacity addressable by the requestor module 10 may be contained in several discrete and functional memory modules, i.e., memory modules 12, 14, 16 and 18. While this functional relationship exists, FIG. 1 illustrates nothing about the physical locations and the physical interconnections between the requestor module 10 and the memory modules 12, 14, 16 and 18.

FIG. 2 more clearly illustrates the modular concept of the digital computer set of the AN/UYK-7(V). Here in FIG. 2 only the request and address interface is illustrated as it is this interface with which the present invention is concerned and finds use. The requestor module 10, of course, sends data to memory modules 12, 14, 16 and 18 and obtains data from those memory modules. However, for purposes of simplicity and clarity, only the request and address interface is illustrated here and in subsequent figures because the present invention is not modifying or manipulating the data interface. The present invention is concerned only with the request and address interface between the requestor module 10 and the memory modules 12, 14, 16 and 18.

Again in FIG. 2 as in FIG. 1 the requestor module 10 sends request and address information to the memory modules 12, 14, 16 and 18 along request and address bus 20. What FIG. 2 illustrates is that this request and address bus 20 is physically routed through a cabinet 26. Thus the request and address bus 20 from requestor module 10 enters the cabinet 26 at point 28 and passes through cabinet 26 and enters memory module 12 at point 30, enters memory module 14 at point 32, enters memory module 16 at point 34 and enters memory module 18 at point 36. If the physical connection at points 28, 30, 32, 34 and 36 consists of a pluggable connection of some sort or fashion it can be readily seen that the requestor module/memory module interface in this representative digital computer set is of a modular nature. The requestor module 10 for example could be removed by simply unplugging it from the cabinet 26 at point 28. Similarly, memory module 12 could be unplugged at point 30 to disconnect it from the cabinet 26.

It is understood, of course, that four memory modules are illustrated in FIG. 2 connected to the single requestor module 10. There may be either more or less memory modules in the actual digital computer system. Similarly, in FIG. 2 memory module 12 is shown connected to one requestor module 10. In an actual digital computer system there may be more than one requestor module interfacing with memory module 12. If this is true than a separate connection must be provided to memory module 12 for the request and address bus from the new requestor. In addition the memory module must contain priority and selection mechanisms for the request and address buses. For simplicity and clarity in the description of the present invention only one requestor module is shown connected to every memory module. It is recognized and understood, however, that the present invention finds application in systems in which there is more than one requestor per memory module.

FIG. 3 is a schematic diagram showing the signals which the requestor 10 supplies to the request and address bus 20 of FIGS. 1 and 2. Here the requestor module 10 is shown containing a memory address register 38. It is recognized and understood that the requestor module 10 contains many other components. However, it is with the interface of the requestor module 10 to the request and address bus 20 that the present invention is concerned. Reference to the other components contained in the requestor module 10 may be had by referencing the NAVSEA documents.

The memory addressing scheme of the preferred embodiment of the present invention consists of a total addressing capacity of 256,000 words. Eighteen binary digital address lines are required in order to address 256,000 words. Thus, the memory address register 38 contains 18 bits labeled 0 through 17. It is also in the scope of the preferred embodiment of the present invention that memories are modular by 32,000 words (16,000 words if address bit 14 is utilized in true and complement form). Thus, the total addressing capacity of 256,000 words is broken into 8 increments of 32,000 words each. Thus, the requestor module 10 functions by taking the upper three bits from the memory address register, namely bits 15, 16 and 17, illustrated by reference numeral 40, and routing them to a 3-to-8 decoder 42. The 3 to 8 decoder 42 merely takes the eight possible binary representations of bits 15, 16 and 17, reference numeral 40, and converts them into eight discrete request lines labeled request 0 through request 7, one request line for each 32,000 word segments addressable. The 3-to-8 decoder is a standard component of digital logic, is readily available from many commercial suppliers and is well understood by those having ordinary skill in the art. The requestor module 10 also supplies the request and address bus 20 with memory address register bit 14, reference numeral 44, and with the complement of memory address register bit 14, labeled $\overline{14}$ (referenced numeral 46). The other 14 bits of the memory address register, namely bits 0 through 13, reference numeral 48, are provided directly to the request and address bus.

Figure 4:
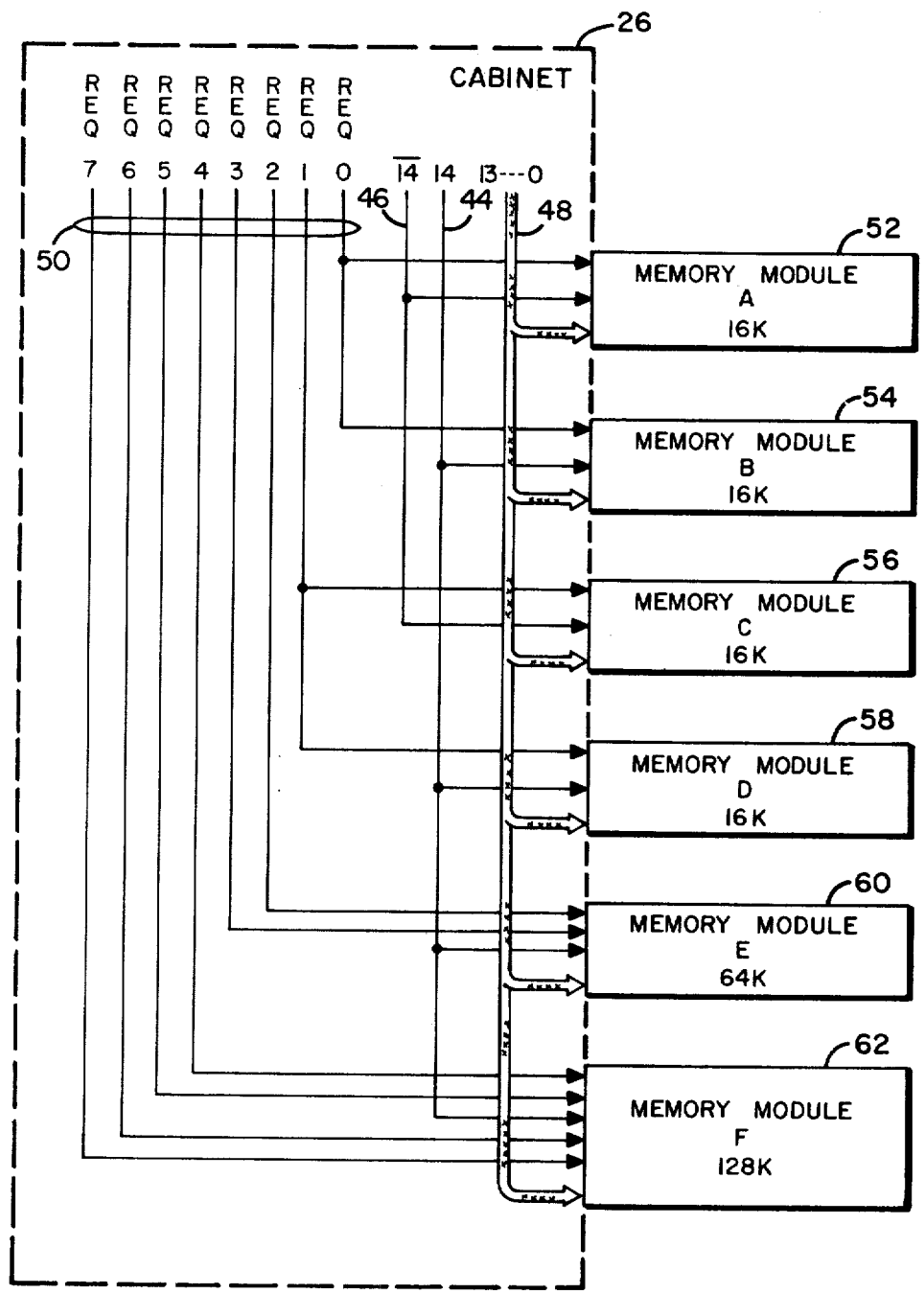
FIG. 4 is a diagram illustrating the cabinet wiring in the modular system showing the wiring of the signals generated by the requestor in FIG. 3.

FIG. 4 illustrates the wiring of the cabinet 26 which contains the request and address bus 20. Here it will be seen how the cabinet makes distribution of the signals supplied to the request and address bus 20 by the requestor module 10. Specifically, it will be seen that address bits 0 through 13, reference numeral 48; address bit 14, reference numeral 44; address bit $\overline{14}$, reference numeral 46; and the eight request signals 0 through 7, reference numeral 50; are distributed by the cabinet to an illustrative six memory modules, memory module A 52, memory module B 54, memory module C 56, memory module D 58, memory module E 60 and memory module F 62. Memory modules A, B, C and D, reference numerals 52, 54, 56 and 58, respectively, represent 16,000 word memory modules. These memory modules are representative of AN/UYK-7(V) memory modules as described in the NAVSEA documents. Memory module E 60 and memory module F 62 are representative of memory modules which are not described in those documents which are new to the present invention and for which the present invention finds particular application. Memory module E 60 is a module which contains 64,000 words and memory module F 62 is a memory module which contains 128,000 words.

Since request 0 signal represents an addressing segment of 32,000 words and memory modules A 52 and B 54 represent 16,000 words each, request 0 signal is sent to both memory module A 52 and memory module B 54. In order to select which 16,000 word memory module A 52 or B 54 should operate, both the true and complement of address bit 14 is supplied. Address bit $\overline{14}$, reference numeral 46, is supplied to memory module A 52 to select the lower 16,000 words of the 32,000 word segment supplied by request 0 signal. Address bit 14, reference numeral 44, is supplied to memory module B 54 to select the upper 16,000 words of that 32,000 word segment. Memory modules C 56 and D 58 are connected similarly only with request 1 signal instead of request 0 signal. Request 1 signal represents the next 32,000 word segment in the overall contiguous addressing scheme. Address bits 0 through 13, reference numeral 48, are connected to all of the memory modules. The connections of memory modules A 52, B 54, C 56 and D 58 are exactly as described in the aforementioned NAVSEA documents.

The present invention specifically contemplates the use of memory modules in the AN/UYK-7(V) computer set environment which have a capacity greater than 16,000 words. Specifically, a memory module containing 64,000 words, a memory module containing 128,000 words and a memory module containing 256,000 words. For illustration of the present invention memory module E 60 is illustrative of a memory module location which is wired to accept a 64,000 word memory module. Memory module F 62 is illustrative of a memory module location which is wired to accept a memory module of 128,000 words. Note that the cabinet wiring is different for these memory modules and different from each other than for the original 16,000 word memory modules A through D. Specifically, a memory module location is wired for a particular size and is wired for a particular segment of the overall addressing scheme. In memory module E 60 request 2 signal and request 3 signal are both routed to the memory module since the memory module contains a 64,000 word segment and each request signal represents a 32,000 word segment. In addition address bits 0 through 14, reference numerals 48 and 44, are also routed to the memory module. For memory module F 62 four request signals, request 4 signal, request 5 signal, request 6 signal and request 7 signal, are routed to the memory module. This is because memory module F 62 is wired for a 128,00 word memory module and each request signal accommodates a 32,000 word segment. In addition, again address bits 0 through 14, reference numerals 48 and 44, are also wired to the memory module.

FIG. 5 is a table which illustrates utilizing the upper four bits of the 18 bit address supplied by the requestor module 10 in which a range of memory addresses are assigned to each of the memory modules A through F described in FIG. 4. In the table address bits 14 through 17 are represented as either binary 0's or binary 1's and it will be noted that each row in the table corresponds to a 16,000 word addressing segment. Thus, the memory request signal number is the same for two rows in the table since each memory request signal represents a 32,000 word memory segment. It will be noted in the table that memory module A is represented by the first row, memory module B by the second and so on through memory module D. Memory modules A through D represent 16,000 word memory modules. Memory module E, a 64,000 word module, is represented by four rows in the table and as illustrated by memory request signals 2 and 3. Memory module F, a 128,000 word module, is represented by eight rows in the table and by memory request 4, 5, 6 and 7 signals. This table is illustrative of the particular address ranges assigned to each memory module. This assignment is determined by the cabinet wiring as defined in FIG. 4.

Figure 6:
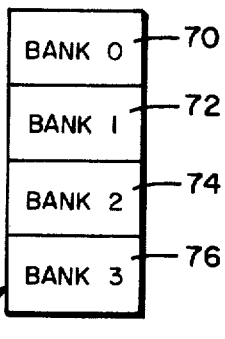
FIG. 6 is a schematic representation of the total address capacity of the addressing scheme of the preferred embodiment of the present invention.

FIG. 6 is a schematic representation of the addressing capacity of a memory module which incorporates the present invention and which will be inserted into the requestor-memory interface previously described. As illustrated in FIG. 6, the total capacity possible of this memory module is 256,000 words. If the memory module has its total possible capacity of 256,000 words it will contain four banks, namely bank 0 70, bank 1 72, bank 2 74 and bank 3 76. However, it is also possible to utilize this memory in a less than full capacity configuration. The memory is also available in a 128,000 word version. In the 128,000 word version the memory would contain only two of the four possible banks available, for example bank 0 70 and bank 1 72 but it would not contain bank 2 74 or bank 3 76. Similarly, the memory is also available in also a 64,000 word version. In the 64,000 word version only one bank would be present, for example bank 0 70 while bank 1 72, bank 2 74 and bank 3 76 would not be available.

As illustrated in FIG. 4, our exemplary cabinet 26 has been wired to accommodate both a 64,000 word memory module and a 128,000 word memory module. The 64,000 word memory module is memory module E 60 and the 128,000 word memory module is memory module F 62. The location of these memory modules in the overall addressing scheme has been illustrated in FIG. 5. Note that memory module E 60 corresponds to memory request 2 and 3 signals or in terms of addressing bits whenever address bit 17 is a 0 and address bit 16 is a 1. Similarly, memory module F 62 corresponds to memory request 4, 5 6 and 7 signals; or, in terms of addressing bits whenever address bit 17 is a 1.

Figure 7:
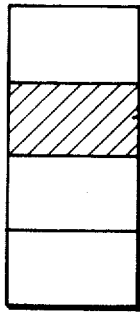
FIG. 7 is a schematic representation of the memory addressing range of memory E illustrated in FIG. 5.

FIG. 7 is an address schematic representation of the addressing range of memory module E 60. The crosshatched area 78 represents the particular range of addresses to be supplied by memory module E 60. Note again on the left that this range of addresses corresponds to when address bit 17 is a 0 and address bit 16 is a 1. Utilizing the address bits directly it will be noted with reference to FIG. 6 that in order for memory module E 60 to accommodate the address range 78 that it would be necessary to have bank 1 72 present within it. Since other memory modules of a capacity of 64,000 words may also be present within the system but with a different addressing range it will be noted that by utilizing the address bits directly it would be necessary to have four different versions of the 64,000 word memory available. That is a 64,000 word memory with bank 0 70 present, a 64,000 word memory with bank 1 72 present, a 64,000 word memory with bank 2 74 present and finally a 64,000 word memory with bank 3 76 present. Note also that having provided memory modules in this manner that the 64,000 word memory versions would not be interchangeable within the requestor-memory system.

Figure 8:
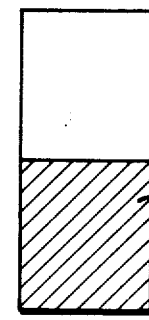
FIG. 8 is a schematic representation of the addressing range of memory F illustrated in FIG. 5.

With reference to FIG. 8 it will be noted that the same problem exists for the 128,000 word memory modules, as in memory module F 62. The addressing range of memory module F 62 as described in FIG. 4 is illustrated in FIG. 8 as the cross-hatched area 80. Note that again this addressing range consists of the address when memory address bit 17 is a 1. To accommodate address range 80 in FIG. 8 memory module F 62 would have to contain bank 2 74 and bank 3 76 as illustrated in FIG. 6. Again since there may be other 128,000 word memory module locations within the requestor-memory system, ones with different address ranges would have to be configured differently in terms of the number of banks present. This presents the same problems as were presented to the 64,000 word version. Additionally, since the memory banks present in memory module F 62 need not be adjacent, it is possible to have six different configurations of memory banks. It is extremely desirable to eliminate this variation in memory modules.

Figure 9:
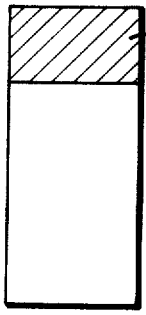
FIG. 9 is a schematic representation of the addressing range, after scaling, of memory E in FIG. 5.

FIG. 9 is a schematic representation of the advantages of scaling the incoming address by the memory modules. In FIG. 9 memory module E 60 is again represented. However, here the address has been scaled by stripping off the upper two address bits, namely address bit 17 and address bit 16. The remaining address bit 15 is utilized in the 64,000 word version of the memory module. Since the address has been scaled, it will be noted that the address range of the memory module E 60 after scaling is represented by the cross-hatched area 82. With reference to FIG. 6 it will be noted that in order to accommodate this addressing range bank 0 70 needs to be present. Since the address has been scaled, all other 64,000 word memory modules will have also scaled their addresses to address bit 15, that is disgarding address bits 16 and 17. Since this has been done all 64,000 word memory modules will have bank 0 70 present and will not need to utilize the other three banks. This means that all 64,000 word memory modules are standardized, may be interchanged and this greatly simplifies provisioning, sparing, troubleshooting and swapping.

Figure 10:
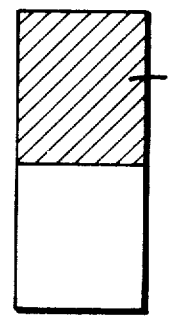
FIG. 10 is a schematic representation of the addressing range, after scaling, of memory F in FIG. 5.

FIG. 10 represents memory module F 62, a 128,000 word memory module after scaling. Note that in FIG. 10 it is only address 17 which is stripped to scale the incoming address to the proper range. The address range of memory module F 62 after scaling is illustrated in FIG. 10 by the cross-hatched area 84. The cross-hatched area 84 in FIG. 10 would represent the fact that memory module F 62 would need to have installed bank 0 70 and bank 1 72, referring to FIG. 6, in order to accommodate that addressing range. Note that with the address scaled as in FIG. 10 the 128,000 word memory modules have become standardized and the standardization advantages similar to those of the 64,000 word memory modules automatically follow.

The important thing to note about FIGS. 9 and 10 is that the address scaling by the memory module itself allows the standardization of memory modules. The memory module addressing is not contingent upon which position it is located within the requestor-memory system. It is also important to note in FIGS. 9 and 10 that the 64,000 word memory modules, that is memory modules containing only one bank, strip the upper two bits, bit 17 and bit 16, from the memory address and the 128,000 word memory modules, memory modules containing two banks, strip one bit, bit 17, from the memory address.

Figure 11:
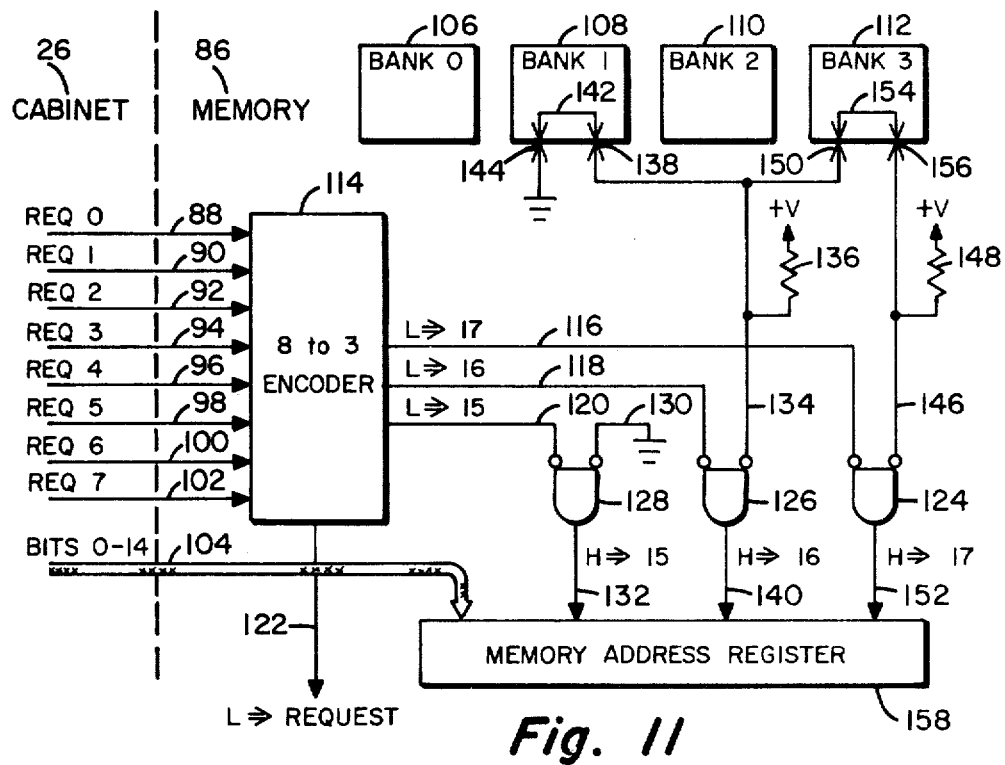
FIG. 11 is a schematic diagram of the scaling apparatus located in the memory modules of the present invention.

FIG. 11 is a schematic illustration of the apparatus within the memory module which provides the automatic address scaling of the present invention. In FIG. 11 the signals from the address and request bus are provided by the cabinet 26 to the interface to the memory module 86. Note that the cabinet 26 may supply all eight of the request signals, request 0 signal through request 7 signal, to the memory module in addition to address bits 0 through 14, reference numeral 104. It is important to note here that only so many of the request signals, 88 through 102, as are required by the memory module 86 size are actually supplied to memory module 86. If memory module 86 is a 256,000 word memory module then all eight request signals, 88 through 102, would be required as illustrated in FIG. 11. However, as has been illustrated in FIG. 4 for a 128,000 word memory module, only four memory request signals are required and only four request lines are supplied, namely request 4 signal through request 7 signal, 96 through 102. Similarly, as illustrated in FIG. 4 for a 64,000 word memory module, only two request signals are required and only two are supplied, namely request 2 signal and request 3 signal, 92 and 94.

The address bus interface of a standard memory module 86 is illustrated in FIG. 11. The memory module 86 may contain up to four banks, namely bank 0 106, bank 1 108, bank 2 110 and bank 3 112. The memory modules are standard and may easily be converted from one capacity to another merely by the installation or removal of one or more of the banks 0 106, 1 108, 2 110, and 3 112. If the memory module 86 is a 64,000 word memory module then only bank 0 106 would be present. If the memory module 86 was a 128,000 word memory module then only banks 0 106 and bank 1 108 would be present; and if the memory module 86 is a 256,000 word memory module all four banks, namely bank 0 106, bank 1 108, bank 2 110 and bank 3 112 would be present.

Since the memory module 86 must be capable of being any capacity it must decode all eight of the request signals, 88 through 102, supplied by the cabinet 26. All eight of the request signals, request 0 signal through request 7 signal, reference numerals 88 through 102, are routed into an 8-to-3 encoder 114. This 8-to-3 encoder is a common piece of digital computer logic and merely takes the eight discrete request signals and recodes the signals into the original three address bits from which the request signals were derived, namely address bit 17, reference numeral 116; address bit 16, reference numeral 118; and address bit 18, reference numeral 120. The 8-to-3 encoder 114 also monitors all eight of the possible request lines or such portion as may actually be present operating a request signal 122 to the memory should one of the connected request lines 88 through 102 be activated.

Following with our examples of memory module E 60 and memory module F 62, memory module E 60 would have request 2 signal 92 connected and request 3 signal 94 connected to it by the cabinet 26. All other requests, namely request 0 signal 88, request 1 signal 90, request 4 signal 96, request 5 signal 98, request 6 signal 100 and request 7 signal 102, would not be supplied to memory module E 60 by the cabinet 26. Similarly, with respect to memory module F 62, the cabinet 26 would supply the four request signals namely request 4 signal 96, request 5 signal 98, request 6 signal 100 and request 7 signal 102. The cabinet 26 would not supply request 0 signal 88, request 1 signal 90, request 2 signal 92 and request 3 signal 94 to the memory module F 62.

The three upper address bits, address bit 17–116, address bit 16–118 and address bit 15–120 which have been reconstructed by the memory module 86 in the 8-to-3 encoder 114 are routed to low input logical AND gates 124, 126 and 128, respectively. This is for the purpose of stripping off of one or more of the upper address bits in order to scale the address bits to the proper capacity. In our discussions of FIG. 9 and 10 it is noted that address bit 15 120 was never stripped and hence the second input 130 to the low input AND gate 128 is tied to logical ground. This will cause address bit 15 120 to pass through low input AND gate 128 and be supplied as a logical high address bit 15 132.

Address bit 16 118 is supplied to low input AND gate 126. The second input 134 to the low input AND gate 126 is run in parallel with a pull-up resistor 136 to a bank connector 138. If bank 1 108 is not present in the memory module 86 then the bank connector 138 will be open and the input 134 to low input AND gate 126 will be a logical high as a result of pull-up resistor 136. A high on input 134 will disable the low input AND gate 126 and prevent output 140 from representing address bit 16. This means that unless the bank 1 108 is installed in the memory module 86 that address bit 16 will be stripped or scaled from the incoming address.

However if bank 1 108 is installed in the memory module 86 then an internal jumper 142 will connect bank connectors 138 with bank connector 144. Bank connector 144 is tied to logical ground. This grounding of input 134 allows address bit 16 118 to pass through the low input AND gate 126 and be supplied as a logical high address bit 16 140.

Similarly, address bit 17 116 is routed to low input AND gate 124. The second input 146 to low input AND gate 124 is tied to a pull-up resistor 148 and to bank connector 156. If bank 3 112 is not resident in the memory module 86, the input 146 will be a logical high as a result of pull-up resistor 148, and the low input AND gate 124 will be disabled and output 152 will not represent address bit 17. However, if bank 3 112 is present in the memory module 86 then an internal jumper 154 will connect bank connector 156 with bank connector 150. Bank connector 150 is connected to bank connector 138 through jumper 142 and bank connector 144 to a logical ground. This will establish a path between input 146 to logical ground within memory module 86 and would allow address bit 17 116 to pass through low input AND gate 124 and be present as a logical high on output 152.

In addition, the memory module 86 connects address bits 0 through 14 104 which are present in the cabinet 26 and connects these address bits 0 through 14 along with outputs 132, 140, 152 to the memory address register 158. The memory address register 158 functions to address the banks 106, 108, 110 and 112 which are present in the memory module 86. The address from the main memory address register 158 onward in the memory module 86 is contemporary and can be followed by reference to the NAVSEA documents.

Note that the result of the scaling apparatus illustrated in FIG. 11 is that address bit 16 118 is stripped from the memory address unless bank 1 108 is present and address bit 17 116 is stripped from the memory address unless bank 1 108 and bank 3 112 are present. This means that for a 64,000 word memory module, only bank 0 106 present, that both address bits 16 and 17 will be stripped or scaled from the incoming memory address. For a 128,000 word memory module, containing bank 0 106 and bank 1 108, that memory address bit 17 will be stripped from the memory address but address bit 16 will still be present. This corresponds to the advantageous scaling result that was discussed in regard to FIGS. 9 and 10. Thus, it will be seen that the scaling apparatus of FIG. 11 will result in a standardization of memory modules which will facilitate the present invention.

Figure 12:
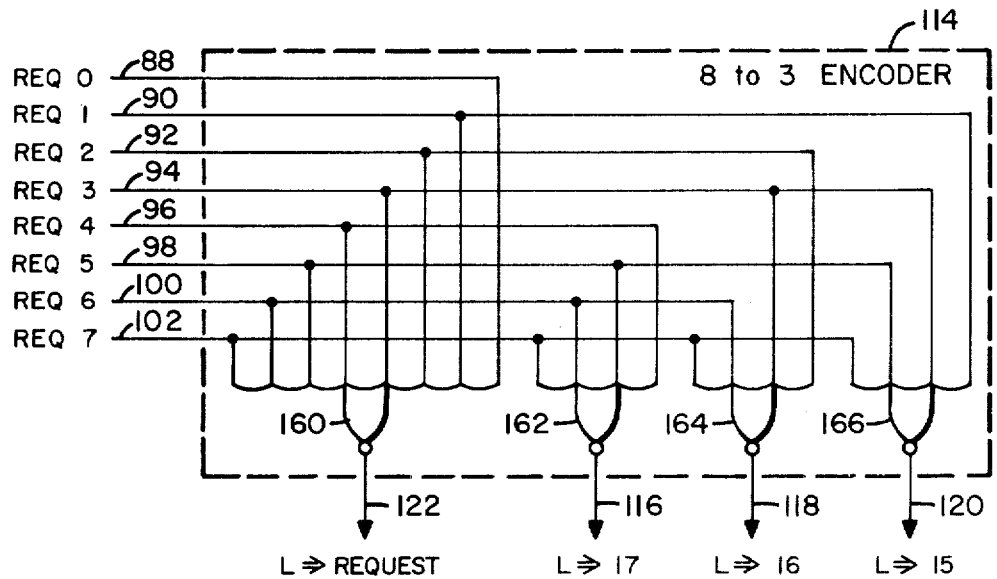
FIG. 12 is a schematic representation of the 8-to-3 encoder illustrated in FIG. 11.

Reference to FIG. 12 will illustrate by virtue of a schematic diagram the contents of the 8-to-3 decoder 114 contained in FIG. 11. Again as in FIG. 11, the 8-to-3 encoder 114 receives the eight request signals, 88 through 102, and produces an actual request signal 122 and in addition the three upper address bits, address bit 17 116, address bit 16 118 and address bit 15 120. This result is accomplished in FIG. 12 by the use of four high input and low output logical OR circuits, 160, 162, 164 and 166. These logical OR circuits are commonly and widely available and any one of which commonly manufactured could be utilized for the circuits. OR circuit 160 is an eight-input circuit while OR circuits 162, 164 and 166 are four-input circuits. All eight of the request signals 88 through 102 are connected to the eight individual inputs of OR circuit 160. The output of OR circuit 160 produces the actual request signal 122. The four inputs to OR circuit 162 consist of request 4 signal 96, request 5 signal 98, request 6 signal 100 and request 7 signal 102. The output of OR circuit 162 produces address bit 17, reference numeral 116. The four inputs to OR circuit 164 consist of request 2 signal 92, request 3 signal 94, request 6 signal 100 and request 7 signal 102. The output of OR circuit 164 forms address bit 16, reference numeral 118. The four inputs to OR circuit 166 are connected to request 1 signal 90, request 3 signal 94, request 5 signal 98 and request 7 signal 102. The output of OR circuit 166 forms address bit 15, reference numeral 120.

The encoding of the eight request signals in to the original three upper address bits, address bits 15, 16 and 17, from the requestor is accomplished in the standard memory module because the addressing scheme and structure of the computer into which the present invention has its preferred use sends only the eight request lines instead of these address bits. If in another memory addressing scheme and structure the original address bits 15, 16 or 17 were available at the memory input, these address bits could be used directly instead of encoding these bits again from the eight request lines, if preferred.

Thus, it can be seen that there has been shown and described a novel apparatus for scaling memory addresses. It is to be understood however that various changes, modifications or substitutions in the form and detail of the described apparatus can be made by those skilled in the art without departing from the scope of the invention as defined by the following claims.

What is claimed is:

1. A data processing apparatus comprising:
   a memory module wherein said memory module has a storage capacity depending upon a variable number of memory banks contained within said memory module;
   a requestor which generates a memory address to be used by said memory module wherein said memory address consists of a plurality of bits;
   determining means responsively coupled to said memory module for determining said variable number of memory banks contained within said memory module;
   stripping means responsively coupled to said requestor and said determining means for stripping from said memory address a one or more of said plurality of bits thereby producing a modified memory address wherein said modified memory address consists of a minimum number of bits sufficient to address said storage capacity of said memory module depending upon said variable number of memory banks as determined by said determining means; and
   means responsively coupled to said memory module and said stripping means for transferrng said modified memory address from said stripping means to said memory module.

2. A data processing system according to claim 1 wherein said determining means further comprises:
   means responsively coupled to each of said variable number of memory banks for generating a plurality of signals whereby each of said signals corresponds to the presence within said memory module of a different one of said variable number of memory banks.

3. A data processing system according to claim 2 wherein said stripping means further comprises:
   gating means responsively coupled to said generating means for disabling a one or more of said plurality of bits of said memory address used to uniquely address a one of said variable number of memory banks if a corresponding one of said plurality of signals is absent.

4. A memory module comprising:
   a variable number of memory banks wherein each of said variable number of memory banks has a fixed number of addressable locations;
   a memory address register responsively coupled to said variable number of memory banks for storing a modified memory address having a variable number of bits whereby said variable number of bits is a minimum number required to uniquely address a one of said fixed number of addressable locations within a one of said variable number of memory banks;
   means responsively coupled to said variable number of memory banks for determining said minimum number of bits required to uniquely address a one of said fixed number of addressable locations within a one of said variable number of memory banks;
   means for receiving a memory address from a requestor whereby said memory address contains a fixed number of bits and whereby said fixed number of bits is at least as large as said variable number of bits;
   means responsively coupled to said receiving means and said determining means for generating said modified memory address by stripping from said memory address a number of bits whereby said number of bits is the difference between the fixed number of bits of said memory address and said minimum number of bits determined by said determining means; and
   means responsively coupled to said generating means and said memory address register for loading said memory address register with said modified memory address.

5. A memory module according to claim 4 wherein said determining means further comprises:
   means physically attached to each of said variable number of memory banks for indicating the presence of a corresponding one of said variable number of memory banks; and
   decoding means responsively coupled to said indicating means for decoding, from the indicating of said indicating means, said minimum number of bits required to uniquely address a one of said fixed number of addressable locations within a one of said variable number of memory banks.

* * * * *